J. R. McCLAIN.
METHOD OF FORMING COMPOSITE PLATES.
APPLICATION FILED OCT. 8, 1919.
1,365,330.  Patented Jan. 11, 1921.
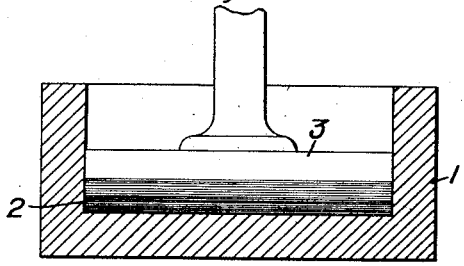
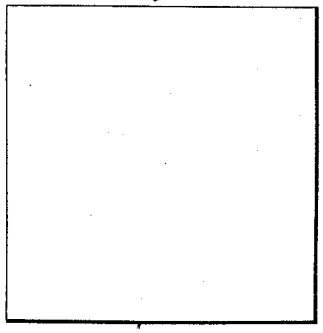
WITNESSES:
J. A. Helsel.
O. E. Bee.
INVENTOR
John R. McClain.
BY
ATTORNEY

UNITED STATES PATENT OFFICE.

JOHN R. McCLAIN, OF EDGEWOOD, PENNSYLVANIA, ASSIGNOR TO WESTINGHOUSE ELECTRIC & MANUFACTURING COMPANY, A CORPORATION OF PENNSYLVANIA.

METHOD OF FORMING COMPOSITE PLATES.

1,365,330.     Specification of Letters Patent.     Patented Jan. 11, 1921.

Application filed October 8, 1919. Serial No. 329,382.

*To all whom it may concern:*

Be it known that I, JOHN R. McCLAIN, a citizen of the United States, and a resident of Edgewood, in the county of Allegheny and State of Pennsylvania, have invented a new and useful Improvement in Methods of Forming Composite Plates, of which the following is a specification.

My invention relates to composite plates and, more particularly, to plates formed of superimposed layers of fibrous sheet material impregnated with a binder, such as shellac, which is adapted to harden under the application of heat and pressure. The primary object of my invention is to provide a method which shall facilitate the production of plates in which a binder, such as shellac, is employed.

Difficulty has been experienced in the manufacture of composite plates formed of fibrous sheet material impregnated with shellac because the shellac has a tendency to cause the material to adhere to the surface of pressure platens when subjected to heat and pressure in a suitable mold or press. One object of my invention, therefore, resides in the provision of a method of constructing plates, of the above designated character, in such manner that the danger of the material adhering to the pressure platens shall be obviated.

With these and other objects in view, my invention will be more fully described, illustrated in the drawings, in the several views of which corresponding numerals indicate like parts, and then particularly pointed out in the claims.

In the drawings, Figure 1 is a transverse sectional view of a mold, illustrating the manner of compacting stacked layers of fibrous sheet material impregnated with a binder to form a composite plate; Fig. 2 is an end view of a composite plate formed in accordance with my invention; Fig. 3 is an end view of a plate of material which is preformed and subsequently divided into a plurality of layers of material which are employed in constructing a plate, such as shown in Fig. 2; Fig. 4 is an end view of a layer of material, such as obtained from the plate shown in Fig. 3, and Fig. 5 is a plan view of the layer of material shown in Fig. 4.

Composite plates comprising superimposed layers of fibrous material impregnated with a suitable binder are widely employed for various electrical purposes, such as insulation, and I have found that a composite plate, formed of superimposed layers of fibrous material impregnated with shellac, to be exceptionally satisfactory as an insulator. The shellac imparts a dielectric strength to the treated material which is highly desirable and it also insures relatively great mechanical strength in the finished plate. Great difficulty has been experienced, however, in forming composite plates in which shellac was employed as a binder on account of the fact that the treated material tends to adhere to the pressure surfaces of the press or mold in which the material is compacted and cured.

In practising my invention, I prefer to employ a plurality of layers of fibrous sheet material which may be impregnated with shellac and superimposed to form a plate of the desired thickness. The plate thus formed may be subjected to heat and pressure to partially cure or harden the binder, after which it may be placed in an oven, preferably a vacuum oven, where it may be subjected to heat for a sufficient length of time to thoroughly cure the binder. A plate thus formed may be separated into the various layers of which it is composed and these layers may be employed as surface sheets upon plates formed of superimposed layers of fibrous material impregnated with shellac. The surface sheets employed in this manner do not adhere to the press platens and permit of easy removal of the cured and compacted plate from the press.

In Fig. 1 is shown a mold comprising a mold body 1 in which is disposed a plate 2 composed of a plurality of superimposed layers of fibrous sheet material impregnated with a binder. Any suitable fibrous sheet material may be employed, such as duck, paper or muslin, and it may be impregnated with shellac. The plate 2 is subjected to heat and pressure in the mold 1 to compact the material and to cure or harden the shellac, which unites the several layers into a unitary body. I have found that the plate 2, constructed in this manner, tends to adhere to the pressure platen 3 and to the bottom of the mold chamber 1 and makes difficult the removal of the plate from the mold without ruining the surfaces, both of the plate and the pressure platen 3.

The construction of the plate 2 may be greatly facilitated by forming a plate 4, shown in Fig. 3, in the manner described for forming the plate 2. The plate 4 may be of less thickness in order to obtain thorough heat penetration through the material. The construction of the plate 4 is slightly modified from that described for the plate 2 in that the pressure or heat employed in the press or mold need not be so great, and the plate 4 is then disposed in a suitable oven, preferably a vacuum oven, where it may be subjected to a temperature of between 135° to 150° C. The plate may be subjected to heat in the oven for approximately 12 hours in order to thoroughly cure the treated material and, when subjected to heat in the vacuum oven in this manner, the occluded gases in the plate tend to separate the various layers of which it is composed. When the plate has been thoroughly cured in the oven, it is removed and the united layers separated into sheets, such as shown in Figs. 4 and 5. As shown in Fig. 3, one corner of the plate may be fanned, in any suitable manner, as indicated at 5, and a knife may be inserted between the layers to separate them from each other.

The several layers or sheets obtained, as above described, may be employed in the manufacture of composite plates, such as shown in Figs. 1 and 2. The sheets may be disposed upon the upper and lower surfaces of the stacked material, after which the stacked material may be subjected to heat and pressure in a mold or press to compact the material and to cure the shellac or binder contained in the material disposed between the surface sheets. The surface sheets become integral parts of the material thus pressed and heated and facilitate the removal of the finished plate from the press, because the surface sheets do not adhere to the pressure surfaces of the press or mold. Furthermore, the surface sheets insure more highly polished surfaces for the finished plate and this is of advantage, in some instances, where a pleasing appearance is desirable. The main advantage, however, of employing treated and cured surface sheets lies in the fact that they prevent the surfaces of the pressure platens from becoming scored and practically useless for the character of work above described.

Although the plates, which are baked in the oven to provide the surface sheets, may be baked in an oven in which atmospheric pressure obtains, I have found it desirable to employ a vacuum oven, because the several layers comprising the plate are more easily separated. This is because the occluded gases expand and create a pressure in the plate which is not equalized by a pressure in the oven and, therefore, tends to separate the composite parts of the plate.

Although I have specifically described a method of constructing composite plates and set forth that shellac is employed as a binder therefor, it will be appreciated that the method may be found applicable to form composite plates impregnated with other binders possessing similar characteristics to that of shellac. It is obvious also, that the method of constructing the plates is subject to minor changes within the scope of my invention, and I desire, therefore, that no limitations shall be imposed except such as are indicated in the appended claims.

I claim as my invention:—

1. The method of forming composite plates that comprises impregnating a plurality of sheets of fibrous material with a binder, superimposing the impregnated sheets to form a plate, subjecting the plate to heat and pressure to compact the material and to harden the binder, dividing the plate into the several layers of which it is composed, disposing a layer of the material thus treated upon the upper and lower surfaces of a plate formed of fibrous material impregnated with a binder and subjecting the body thus formed to heat and pressure to form a unitary article.

2. The method of forming composite plates that comprises impregnating layers of fibrous material with shellac, superimposing a plurality of the treated layers to form a plate of the desired thickness, subjecting the plate to heat and pressure, disposing the plate in an oven and applying further heat to thoroughly cure the binder, dividing the plate into the several layers of which it is composed, disposing a layer of the material thus obtained upon the lower and upper surfaces of a plate formed of superimposed layers of fibrous material impregnated with shellac and applying heat and pressure to the body thus assembled to form a unitary article.

3. A method of forming composite plates that comprises impregnating a plurality of layers of fibrous material with shellac, superimposing a plurality of the layers to form a plate of the desired thickness, subjecting the body thus formed to heat and pressure to compact the material and partially cure the shellac, disposing the plate in a vacuum oven and applying heat to thoroughly cure the shellac, dividing the plate into the several layers of the material thus obtained upon the upper and lower surfaces of a plate formed of fibrous material impregnated with a binder and applying heat and pressure to the body thus assembled to form a unitary and homogeneous article.

4. The method of forming composite plates that comprises impregnating a plurality of layers of fibrous material with shellac, superimposing a plurality of the layers to form a plate, applying heat and pressure thereto to compact the material and to partially harden the shellac, disposing the plate in a vacuum oven, heating the oven to substantially 135° C., dividing the plate into the several layers of which it is composed after the binder has been thoroughly hardened, disposing the layers thus obtained upon the upper and lower surfaces of plates formed of fibrous material impregnated with a binder and applying heat and pressure thereto to compact the material and to form unitary bodies.

5. The method of forming composite plates that comprises impregnating layers of fibrous material with shellac, superimposing a plurality of the layers to form a plate, applying heat and pressure thereto to compact the fibrous material and to partially cure the shellac, disposing the partially cured plate in a vacuum oven, subjecting the plate to a temperature of substantially 135° C. for approximately 12 hours, removing the plate from the oven and dividing it into the several layers of which it is composed, disposing the layers thus obtained upon the upper and lower surfaces of plates of fibrous material impregnated with shellac and applying heat and pressure thereto to compact the material and to form unitary bodies.

In testimony whereof, I have hereunto subscribed my name this 30th day of Sept., 1919.

JOHN R. McCLAIN.